(12) United States Patent
Henderson et al.

(10) Patent No.: US 9,115,224 B2
(45) Date of Patent: Aug. 25, 2015

(54) REACTOR CONTINUITY

(75) Inventors: Lee Douglas Henderson, Calgary (CA); Peter Phung Minh Hoang, Calgary (CA); Ian Ronald Jobe, Calgary (CA); Xiaoliang Gao, Calgary (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 57 days.

(21) Appl. No.: 13/430,070

(22) Filed: Mar. 26, 2012

(65) Prior Publication Data

US 2012/0259080 A1   Oct. 11, 2012

(30) Foreign Application Priority Data

Apr. 7, 2011   (CA) ..................................... 2736674

(51) Int. Cl.
| | |
|---|---|
| *B01J 31/38* | (2006.01) |
| *B01J 31/00* | (2006.01) |
| *C08F 4/52* | (2006.01) |
| *C08F 4/64* | (2006.01) |
| *C08F 4/76* | (2006.01) |
| *C08F 4/659* | (2006.01) |

(52) U.S. Cl.
CPC .................. *C08F 4/65904* (2013.01)

(58) Field of Classification Search
USPC ......... 502/104, 103, 113, 117, 118, 123, 124, 502/125, 126, 129, 100, 439; 526/74, 161
See application file for complete search history.

(56) References Cited

U.S. PATENT DOCUMENTS

| | | | |
|---|---|---|---|
| 3,917,466 A | 11/1975 | Henry, Jr. | |
| 4,182,810 A | 1/1980 | Willcox | |
| 4,325,849 A | 4/1982 | Rosen et al. | |
| 5,554,775 A | 9/1996 | Krishnamurti et al. | |
| 5,637,659 A | 6/1997 | Krishnamurti et al. | |
| 5,684,097 A | 11/1997 | Palmroos et al. | |
| 6,117,955 A * | 9/2000 | Agapiou et al. | ............. 526/141 |
| 6,140,432 A | 10/2000 | Agapiou et al. | |
| 6,147,172 A | 11/2000 | Brown et al. | |
| 6,235,918 B1 * | 5/2001 | Marks et al. | .................... 556/53 |
| 6,271,325 B1 | 8/2001 | McConville et al. | |
| 6,281,306 B1 | 8/2001 | Oskam et al. | |
| 6,300,271 B1 * | 10/2001 | McDaniel et al. | ............ 502/104 |
| 6,309,997 B1 | 10/2001 | Fujita et al. | |
| 6,562,924 B2 | 5/2003 | Benazouzz et al. | |
| 6,639,028 B2 | 10/2003 | Heslop et al. | |
| 6,646,074 B2 | 11/2003 | Herzog et al. | |
| 6,653,416 B2 | 11/2003 | McDaniel et al. | |
| 6,734,266 B2 * | 5/2004 | Gao et al. | ...................... 526/129 |
| 6,831,141 B2 * | 12/2004 | McDaniel et al. | ............ 526/129 |
| 7,001,962 B2 * | 2/2006 | Gao et al. | ...................... 526/116 |
| 7,005,400 B2 | 2/2006 | Takahashi | |
| 7,064,096 B1 | 6/2006 | Hoang et al. | |
| 7,273,912 B2 | 9/2007 | Jacobsen et al. | |
| 8,298,978 B2 * | 10/2012 | Gao et al. | ...................... 502/152 |
| 8,304,361 B2 * | 11/2012 | Gao et al. | ...................... 502/152 |
| 2012/0259070 A1 * | 10/2012 | Henderson et al. | ........... 525/189 |
| 2012/0259080 A1 * | 10/2012 | Henderson et al. | ........... 526/140 |
| 2012/0259081 A1 * | 10/2012 | Henderson et al. | ........... 526/172 |
| 2012/0316297 A1 * | 12/2012 | Hoang et al. | .................. 526/100 |

FOREIGN PATENT DOCUMENTS

CA       2716772 A1    4/2011

OTHER PUBLICATIONS

Herberich et al, Borabenzene Derivatives, Organometallics, 1995, 14, 471-480.
Peri et al, The Surface Structure of Silica Gel, J. Phys. Chem., 1968, 72 (8), 2926.

* cited by examiner

*Primary Examiner* — Rip A. Lee
(74) *Attorney, Agent, or Firm* — Kenneth H Johnson

(57) ABSTRACT

A supported catalyst system comprising a phosphinimine ligand containing catalyst on an alumina support treated with a metal salt has improved reactor continuity in a dispersed phase reaction in terms of initial activation and subsequent deactivation. The resulting catalyst has a lower consumption of ethylene during initiation and a lower rate of deactivation. Preferably the catalyst is used with an antistatic agent.

3 Claims, 1 Drawing Sheet

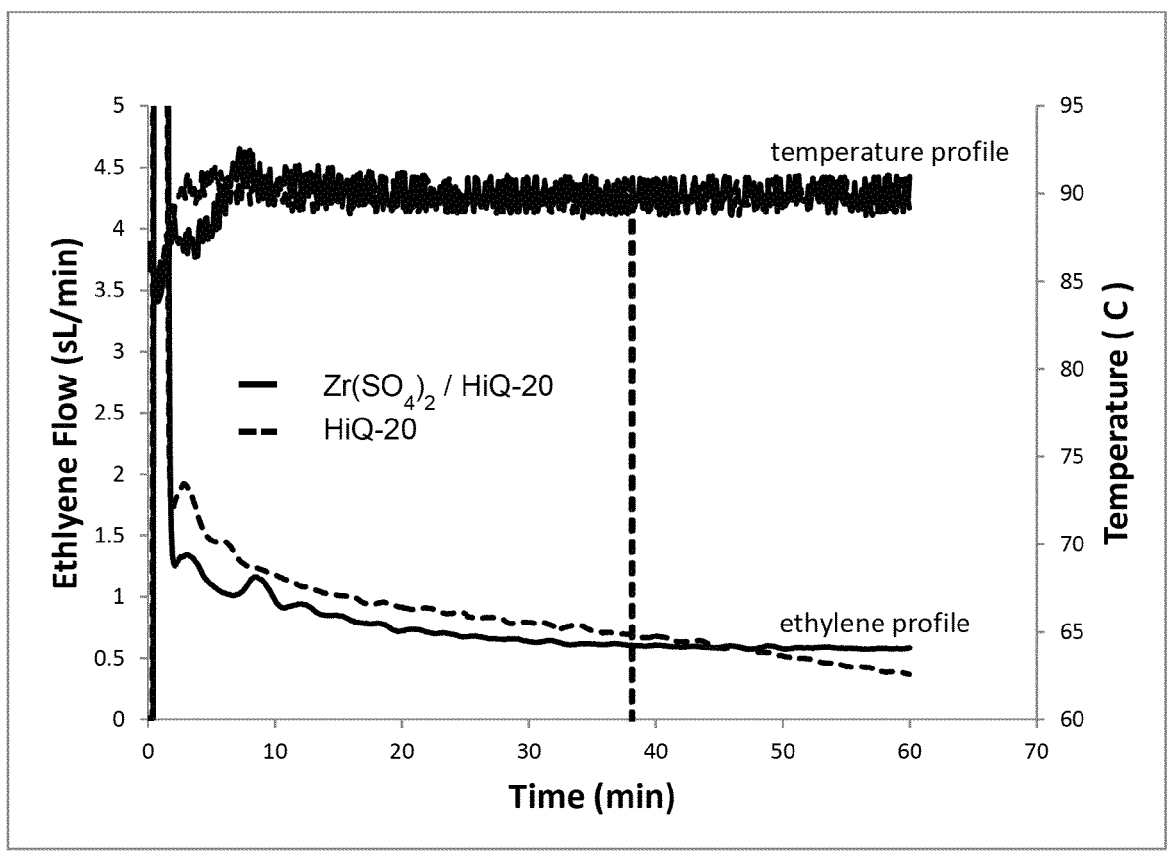

REACTOR CONTINUITY

FIELD OF THE INVENTION

The present invention relates to improving the continuity of a phosphinimine ligand containing catalyst on an alumina support in a dispersed phase (i.e. gas phase, fluidized bed or stirred bed or slurry phase) olefin polymerization. There are a number of factors which impact on reactor continuity in a dispersed phase polymerization. A decrease in catalyst productivity or activity is reflected by a decrease in ethylene uptake over time but may also result in a lower kinetic profile and potentially a lower potential for fouling.

BACKGROUND OF THE INVENTION

Single site catalysts for the polymerization of alpha olefins were introduced in the mid 1980's. These catalysts are more active than the prior Ziegler Natta catalysts, which may lead to issues of polymer agglomeration. Additionally, static may contribute to the problem. As a result reactor continuity (e.g. fouling and also catalyst life time) may be a problem.

The kinetic profile of many single site catalysts starts off with a very high activity over a relatively short period of time, typically about the first five minutes of the reaction, the profile then goes through an inflection point and decreases rapidly for about the next five minutes and thereafter there is period of relative slower decline in the kinetic profile. This may be measured by the ethylene uptake, typically in standard liters of ethylene per minute in the reactor.

Canadian Patent Application 2,716,772 filed Oct. 6, 2010 discloses a process to improve the dispersed phase reactor continuity of catalyst having a phosphinimine ligand by supporting the catalyst on a silica support treated with $Zr(SO_4)_2 \cdot 4H_2O$. The support is also treated with MAO. This patent application fails to disclose or suggest an alumina support.

U.S. Pat. No. 6,734,266 issued May 11, 2004 to Gao et al., assigned to NOVA Chemicals (International) S.A. teaches sulfating the surface of porous inorganic support with an acid, amide or simple salt such as an alkali or alkaline earth metal sulphate. The resulting treated support may be calcined. Aluminoxane and a single site catalyst are subsequently deposited on the support. The resulting catalyst shows improved activity. However, the patent fails to teach or suggest depositing zirconium sulphate on an alumina support.

U.S. Pat. No. 7,001,962 issued Feb. 21, 2006 to Gao et al., assigned to NOVA Chemicals (International) S.A. teaches treating a porous inorganic support with a zirconium compound including zirconium sulphate and an acid such as a fluorophosphoric acid, sulphonic acid, phosphoric acid and sulphuric acid. The support is dried and may be heated under air at 200° C. and under nitrogen up to 600° C. Subsequently a trialkyl aluminum compound (e.g. triethyl aluminum) or an alkoxy aluminum alkyl compound (e.g. diethyl aluminum ethoxide) and a single site catalyst are deposited on the support. The specification teaches away from using aluminoxane compounds. The activity of these supports is typically lower than the activity of the catalyst of U.S. Pat. No. 6,734,266 (compare Table 5 of U.S. Pat. No. 7,001,962 with Table 2 of U.S. Pat. No. 6,734,266). The present invention eliminates the required acid reagent that reacts with the zirconium compound.

U.S. Pat. No. 7,273,912 issued Sep. 25, 2007 to Jacobsen et al., assigned to Innovene Europe Limited, teaches a catalyst which is supported on a porous inorganic support which has been treated with a sulphate such as ammonium sulphate or an iron, copper, zinc, nickel or cobalt sulphate. The support may be calcined in an inert atmosphere at 200 to 850° C. The support is then activated with an ionic activator and then contacted with a single site catalyst. The patent fails to teach aluminoxane compounds and zirconium sulphate.

U.S. Pat. No. 7,005,400 issued Feb. 28, 2006 to Takahashi, assigned to Polychem Corporation teaches a combined activator support comprising a metal oxide support and a surface coating of a group 2, 3, 4, 13 and 14 oxide or hydroxide different from the carrier. The support is intended to activate the carrier without the conventional "activators". However, in the examples the supported catalyst is used in combination with triethyl aluminum. The triethyl aluminum does not appear to be deposited on the support. Additionally the patent does not teach phosphinimine catalysts.

U.S. Pat. No. 7,442,750 issued Oct. 28, 2008 to Jacobsen et al., assigned to Innovene Europe Limited teaches treating an inorganic metal oxide support typically with a transition metal salt, preferably a sulphate, of iron, copper, cobalt, nickel, and zinc. Then a single site catalyst, preferably a constrained geometry single site catalyst and an activator are deposited on the support. The activator is preferably a borate but may be an aluminoxane compound. The disclosure appears to be directed at reducing static in the reactor bed and product in the absence of a conventional antistatic agent such as STADIS®.

U.S. Pat. No. 6,653,416 issued Nov. 25, 2003 to McDaniel at al., assigned to Phillips Petroleum Company, discloses a fluoride silica-zirconia or titania porous support for a metallocene catalyst activated with an aluminum compound selected from the group consisting of alkyl aluminums, alkyl aluminum halides and alkyl aluminum alkoxides. The patent does not suggest an alumina support. Comparative examples 10 and 11 show the penetration of zirconium into silica to form a silica-zirconia support. However, the examples (Table 1) show the resulting catalyst has a lower activity than those when the supports were treated with fluoride.

None of the above art suggests treating the support with an antistatic agent.

The use of a salt of a carboxylic acids, especially aluminum stearate, as an antifouling additive to olefin polymerization catalyst compositions is disclosed in U.S. Pat. No. 6,271,325 (McConville et al., to Univation) and U.S. Pat. No. 6,281,306 (Oskam et al., to Univation).

The preparation of supported catalysts using an amine antistatic agent, such as the fatty amine sold under the trademark KEMANINE® AS-990, is disclosed in U.S. Pat. No. 6,140,432 (Agapiou et al.; to Exxon) and U.S. Pat. No. 6,117,955 (Agapiou et al.; to Exxon).

Antistatic agents are commonly added to aviation fuels to prevent the buildup of static charges when the fuels are pumped at high flow rates. The use of these antistatic agents in olefin polymerizations is also known. For example, an aviation fuel antistatic agent sold under the trademark STADIS composition (which contains a "polysulfone" copolymer, a polymeric polyamine and an oil soluble sulfonic acid) was originally disclosed for use as an antistatic agent in olefin polymerizations in U.S. Pat. No. 4,182,810 (Wilcox, to Phillips Petroleum). The examples of the Wilcox '810 patent illustrate the addition of the "polysulfone" antistatic agent to the isobutane diluent in a commercial slurry polymerization process. This is somewhat different from the teachings of the earlier referenced patents—in the sense that the carboxylic acid salts or amine antistatics of the other patents were added to the catalyst, instead of being added to a process stream.

The use of "polysulfone" antistatic composition in olefin polymerizations is also subsequently disclosed in:

1) chromium catalyzed gas phase olefin polymerizations, in U.S. Pat. No. 6,639,028 (Heslop et al.; assigned to BP Chemicals Ltd.);

2) Ziegler Natta catalyzed gas phase olefin polymerizations, in U.S. Pat. No. 6,646,074 (Herzog et al.; assigned to BP Chemicals Ltd.); and 3) metallocene catalyzed olefin polymerizations, in U.S. Pat. No. 6,562,924 (Benazouzz et al.; assigned to BP Chemicals Ltd.).

The Benazouzz et al. patent does teach the addition of STADIS antistatic agent to the polymerization catalyst in small amounts (about 150 ppm by weight). However, in each of the Heslop et al. '028, Herzog et al. '074 and Benazouzz et al. '924 patents listed above, it is expressly taught that it is preferred to add the STADIS antistatic directly to the polymerization zone (i.e. as opposed to being an admixture with the catalyst).

None of the above art discusses the kinetic profile of the catalyst system. One of the difficulties with high activity ("hot") catalyst is that they tend to have a very high initial reactivity (ethylene consumption) that goes through an inflection point and rapidly decreases over about the first 10 minutes of reaction and then decreases at a much lower rate over the next 50 minutes together with fluctuations in reactor temperature. It is desirable to have a high activity catalyst (e.g. more than about 1,500 grams of polymer per gram of supported catalyst normalized to 200 psig (1,379 kPa) ethylene partial pressure and 90° C.) having a kinetic profile for a plot of ethylene consumption in standard liters of ethylene per minute against time in minutes, corrected for the volume of ethylene in the reactor prior to the commencement of the reaction, in a 2 liter reactor over a period of time from 0 to 60 minutes is such that the ratio of the maximum peak height over the first 10 minutes to the average ethylene consumption from 10 to 60 minutes taken at not less than 40, preferably greater than 60 most preferably from 120 to 300 data points, is less than 3.0, preferably less than 2.5, most preferably less than 2.

The present invention seeks to provide a catalyst having a kinetic profile as described above, optionally having reduced static and its use in the dispersed phase polymerization of olefins.

SUMMARY OF THE INVENTION

In one embodiment the present invention provides a catalyst system having an activity greater than 1,500 g of polymer per gram of supported catalyst per hour normalized to 1,379 kPag (200 psig) of ethylene partial pressure and a temperature of 90° C. in the presence of 1-hexene comonomer and a kinetic profile for a plot of ethylene consumption in standard liters of ethylene per minute against time in minutes, at a reaction pressure of 1,379 kPag (200 psig) and 90° C., corrected for the volume of ethylene in the reactor prior to the commencement of the reaction, in a 2 liter reactor over a period of time from 0 to 60 minutes is such that the ratio of the maximum peak height over the first 10 minutes to the average ethylene consumption from 10 to 60 minutes taken at not less than 40 data points, is less than 2.5, comprising:

(i) an alumina support having an average particle size from 10 to 150 microns, a surface area greater than 100 m²/g, and a pore volume greater than 0.3 ml/g impregnated with (ii) at least a 1 weight % based on the weight of alumina of $Zr(SO_4)_2 \cdot 4H_2O$, based on the weight of the support of said salt;

(iii) from 10 to 60 weight % of an aluminum activator based on the weight of said alumina support said activator having the formula:

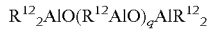

wherein each $R^{12}$ is independently selected from the group consisting of $C_{1-20}$ hydrocarbyl radicals and q is from 3 to 50; and (iv) from 0.1 to 30 weight % of a phosphinimine catalyst of the formula:

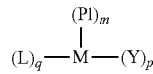

wherein M is a group 4 metal having an atomic weight less than 179; PI is a phosphinimine ligand of the formula

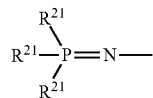

wherein each $R^{21}$ is independently selected from the group consisting of a hydrogen atom; a halogen atom; $C_{1-10}$ hydrocarbyl radicals which are unsubstituted by or further substituted by a halogen atom; L is a monoanionic ligand selected from the group consisting of a cyclopentadienyl radical which is unsubstituted or substituted by a substituent selected from the group consisting of a $C_{1-6}$ alkyl radical which is substituted by 2n+1 fluorine atoms where n is the number of carbon atoms in the alkyl radical, and a $C_6F_5$ radical which cyclopentadienyl ligand is optionally further substituted with up to two $C_{3-6}$ alkyl radicals [in the 2 or 3 position relative to the fluorine containing substituent]; Y is an activatable ligand; m is 1 or 2; q is 1; and p is an integer and the sum of m+q+p equals the valence state of M.

In a further embodiment the present invention provides the above catalyst further comprising from 15,000 to 120,000 ppm based on the weight of the supported catalyst of an antistatic comprising:

(i) from 3 to 48 parts by weight of one or more polysulfones comprising:
 (a) 50 mole % of sulphur dioxide;
 (b) 40 to 50 mole % of a $C_{6-20}$ an alpha olefin; and
 (c) from 0 to 10 mole % of a compound of the formula ACH=CHB where A is selected from the group consisting of a carboxyl radical and a $C_{1-15}$ carboxy alkyl radical and B is a hydrogen atom or a carboxyl radical provided if A and B are carboxyl radicals A and B may form an anhydride;

(ii) from 3 to 48 parts by weight of one or more polymeric polyamides of the formula:

wherein $R^{21}$ is an aliphatic hydrocarbyl group of 8 to 24 carbon atoms; $R^{22}$ is an alkylene group of 2 to 6 carbon atoms; $R^{23}$ is the group $R^{22}$—$NR^{21}$; $R^{20}$. $R^{21}$ or an N-aliphatic hydrocarbyl alkylene group having the formula $R^{21}NHR^{22}$; a, b and c are integers from 0 to 20 and x is 1 or 2; with the proviso that when $R^{20}$ is $R^{21}$ then a is greater than 2 and b=c=0, and when $R^{20}$ is $R^{21}NHR^{22}$ then a is 0 and the sum of b+c is an integer from 2 to 20; and (iii) from 3 to 48 parts by weight of $C_{10-20}$ alkyl or arylalkyl sulphonic acid.

In a further embodiment the present invention provides a process of making a catalyst system having an activity greater than 1,500 g of polymer per gram of supported catalyst per hour normalized to 1,379 kPag (200 psig) of ethylene partial pressure and a temperature of 90° C. in the presence of 1-hexene comonomer and a kinetic profile for a plot of ethylene consumption in standard liters of ethylene per minute against time in minutes, at a reaction pressure of 1,379 kPag (200 psig) and 90° C., corrected for the volume of ethylene in the reactor prior to the commencement of the reaction, in a 2 liter reactor over a period of time from 0 to 60 minutes is such that the ratio of the maximum peak height over the first 10 minutes to the average ethylene consumption from 10 to 60 minutes taken at not less than 40 data points, is less than 2.5, comprising:

(i) impregnating an alumina support having an average particle size from 10 to 150 microns, a surface area greater than 100 m²/g, and a pore volume greater than 0.3 ml/g with (ii) at least a 1 weight % aqueous solution of $Zr(SO_4)_2 \cdot 4H_2O$, to provide not less than 1 weight % based on the weight of the support of said salt;

(iii) recovering the impregnated support;

(iv) calcining said impregnated support in one or more steps at a temperature from 300° C. to 600° C. for a time from 2 to 20 hours in an inert atmosphere;

(v) and either (a) contacting said calcined support with a hydrocarbyl solution containing an aluminum activator compound of the formula:

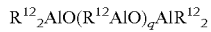

wherein each $R^{12}$ is independently selected from the group consisting of $C_{1-20}$ hydrocarbyl radicals and q is from 3 to 50 to provide from 10 to 60 weight % of said aluminum compound based on the weight of said calcined support; optionally, separating said activated support from said hydrocarbyl solution and contacting said activated support with a hydrocarbyl solution containing a single site catalyst as set out below to provide from 0.1 to 30 weight % of said catalyst;

Or (b) contacting said support with a hydrocarbyl solution of an aluminum activator compound of the formula:

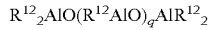

wherein each $R^{12}$ is independently selected from the group consisting of $C_{1-20}$ hydrocarbyl radicals and q is from 3 to 50 to provide from 10 to 60 weight % of said activator and at of a single site catalyst of the formula:

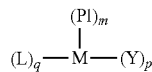

wherein M is selected from the group consisting of Ti, Zr and Hf; PI is a phosphinimine ligand of the formula:

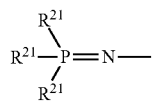

wherein each $R^{21}$ is independently selected from the group consisting of a hydrogen atom; a halogen atom; $C_{1-10}$ hydrocarbyl radicals which are unsubstituted by or further substituted by a halogen atom;

L is a monoanionic ligand selected from the group consisting of a cyclopentadienyl radical which is unsubstituted or substituted by a substituent selected from the group consisting of a $C_{1-6}$ alkyl radical which is substituted by 2n+1 fluorine atoms where n is the number of carbon atoms in the alkyl radical, and a $C_6F_5$ radical which cyclopentadienyl ligand is optionally further substituted with up to two $C_{3-6}$ alkyl radicals [in the 2 or 3 position relative to the fluorine containing substituent]; Y is an activatable ligand; m is 1 or 2; q is 1; and p is an integer and the sum of m+q+p equals the valence state of M to provide from 0.1 to 30 weight % of said catalyst and (vi) recovering and drying the catalyst.

In a further embodiment the present invention provides the above process further comprising contacting said catalyst with from 15,000 to 120,000 ppm based on the weight of the supported catalyst of an antistatic comprising:

(i) from 3 to 48 parts by weight of one or more polysulfones comprising:

(a) 50 mole % of sulphur dioxide;

(b) 40 to 50 mole % of a $C_{6-20}$ an alpha olefin; and (c) from 0 to 10 mole % of a compound of the formula ACH=CHB where A is selected from the group consisting of a carboxyl radical and a $C_{1-15}$ carboxy alkyl radical; and B is a hydrogen atom or a carboxyl radical provided if A and B are carboxyl radicals A and B may form an anhydride;

(ii) from 3 to 48 parts by weight of one or more polymeric polyamides of the formula:

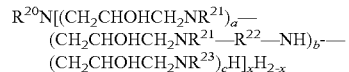

wherein $R^1$ is an aliphatic hydrocarbyl group of 8 to 24 carbon atoms; $R^2$ is an alkylene group of 2 to 6 carbon atoms; $R^3$ is the group-$R^2$—NR'; R is $R^1$ or an N-aliphatic hydrocarbyl alkylene group having the formula $R^1NHR^2$, a, b and c are integers from 0 to 20 and x is 1 or 2; with the proviso that when R is $R^1$ then a is greater than 2 and b=c=0, and when R is $R^1NHR^2$ then a is 0 and the sum of b+c is an integer from 2 to 20; and (iii) from 3 to 48 parts by weight of $C_{10-20}$ alkyl or arylalkyl sulphonic acid and optionally from 0 to 150 parts by weight of a solvent or diluent.

In a further embodiment the present invention provides a dispersed phase olefin polymerization process having improved reactor continuity conducted in the presence of the above catalyst further comprising an antistatic agent.

In a further embodiment the present invention provides a disperse phase polymerization process comprising contacting one or more $C_{2-8}$ alpha olefins with a catalyst system which does not contain an antistatic agent, and feeding to the reactor from 10 to 80 ppm based on the weight of the polymer produced of an antistatic comprising:

(i) from 3 to 48 parts by weight of one or more polysulfones comprising:

(a) 50 mole % of sulphur dioxide;

(b) 40 to 50 mole % of a $C_{6-20}$ an alpha olefin; and (c) from 0 to 10 mole % of a compound of the formula ACH=CHB where A is selected from the group consisting of a carboxyl radical and a $C_{1-15}$ carboxy alkyl radical and B is a hydrogen atom or a carboxyl radical provided if A and B are carboxyl radicals A and B may form an anhydride;

(ii) from 3 to 48 parts by weight of one or more polymeric polyamides of the formula:

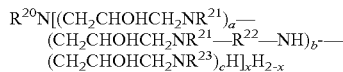

wherein $R^{21}$ is an aliphatic hydrocarbyl group of 8 to 24 carbon atoms; $R^{22}$ is an alkylene group of 2 to 6 carbon atoms; $R^{23}$ is the group $R^{22}$—$NR^{21}$; $R^{20}$. $R^{21}$ is or an N-aliphatic hydrocarbyl alkylene group having the formula $R^{21}NHR^{22}$; a, b and c are integers from 0 to 20 and x is 1 or 2; with the proviso that when $R^{20}$ is $R^{21}$ then a is greater than 2 and b=c=0, and when $R^{20}$ is $R^{21}NHR^{22}$ then a is 0 and the sum of b+c is an integer from 2 to 20; and (iii) from 3 to 48 parts by weight of $C_{10-20}$ alkyl or arylalkyl sulphonic acid.

BRIEF DESCRIPTION OF THE DRAWING

FIG. 1 is the kinetic profile of the catalysts run in example 1.

DETAILED DESCRIPTION

As used in this specification dispersed phase polymerization means a polymerization in which the polymer is dispersed in a fluid polymerization medium. The fluid may be liquid in which case the polymerization would be a slurry phase polymerization or the fluid could be gaseous in which case the polymerization would be a gas phase polymerization, either fluidized bed or stirred bed.

As used in this specification kinetic profile means a plot of ethylene consumption in standard liters of ethylene per minute against time in minutes, corrected for the volume of ethylene in the reactor prior to the commencement of the reaction, in a 2 liter reactor over a period of time from 0 to 60 minutes.

As used in this specification gram of supported catalyst means a gram of the catalyst system and activator on the support treated with $Zr(SO_4)_2 \cdot 4H_2O$.

The Support

The support for the catalysts of the present invention comprises activated alumina. Typically the alumina is heated to temperatures in the range from about 600° C. to about 800° C.

The support should have an average particle size from about 10 to 150 microns, preferably from about 20 to 100 microns. The support should have a large surface area typically greater than about 100 m²/g, preferably greater than about 200 m²/g, most preferably from 250 m²/g to 500 m²/g. The support will be porous and will have a pore volume from about 0.25 to 3.0 ml/g, typically from 0.3 to 0.5 ml/g.

One suitable support for the present invention is sold by Alcoa Industrial Chemicals under the trade name HiQ-20 Alumina.

Treatment of the Support

The support is treated with an aqueous solution of $Zr(SO_4)_2 \cdot 4H_2O$. The support need not be dried or calcined as it is contacted with an aqueous solution.

Generally a 2 to 50, typically a 5 to 15, preferably an 8 to 12, most preferably a 9 to 11 weight % aqueous solution of $Zr(SO_4)_2 \cdot 4H_2O$ is used to treat the support. The support is contacted with the solution of $Zr(SO_4)_2 \cdot 4H_2O$ at a temperature from 10° C. to 50° C., preferably from 20 to 30° C., for a time of not less than 30 minutes, typically from 1 to 10 hours, preferably from 1 to 4 hours, until the support is thoroughly impregnated with the solution.

The impregnated support is then recovered typically by drying at an elevated temperature from 100° C. to 150° C., preferably from 120° C. to 140° C., most preferably from 130° C. to 140° C., for about 8 to 12 hours (e.g. overnight). Other recovery methods would be apparent to those skilled in the art.

The dried impregnated support is then calcined. It is important that the support be calcined prior to the initial reaction with an aluminum activator, catalyst or both. Generally, the support may be heated at a temperature of at least 200° C. for up to 24 hours, typically at a temperature from 500° C. to 675° C., preferably from 550° C. to 600° C. for about 2 to 20, preferably 4 to 10 hours. The resulting support will be free of adsorbed water and should have a surface hydroxyl content from about 0.1 to 5 mmol/g of support, preferably from 0.5 to 3 mmol/g of support.

The amount of the hydroxyl groups in a support may be determined according to the method disclosed by J. B. Peri and A. L. Hensley, Jr., in *J. Phys. Chem.*, 72 (8), 2926, 1968, the entire contents of which are incorporated herein by reference.

The $Zr(SO_4)_2$ is substantially unchanged by calcining under the conditions noted above. At higher temperatures the $Zr(SO_4)_2$ starts to be converted to ZrO.

The resulting dried and calcined support is then contacted sequentially with the activator and the catalyst in an inert hydrocarbon diluent.

The Activator

The activator is an aluminoxane compound of the formula $R^{12}_2AlO(R^{12}AlO)_qAlR^{12}_2$ wherein each $R^{12}$ is independently selected from the group consisting of $C_{1-20}$ hydrocarbyl radicals and q is from 3 to 50. In the aluminum activator preferably $R^{12}$ is a $C_{1-4}$ alkyl radical, preferably a methyl radical and q is from 10 to 40. Optionally, a hindered phenol may be used in conjunction with the aluminoxane to provide a molar ratio of Al:hindered phenol from 2:1 to 5:1 if the hindered phenol is present. Generally the molar ratio of Al:hindered phenol, if it is present, is from 3.25:1 to 4.50:1. Preferably the phenol is substituted in the 2, 4 and 6 position by a $C_{2-6}$ alkyl radical. Desirably the hindered phenol is 2,6-di-tert-butyl-4-ethyl-phenol.

The aluminum compounds (aluminoxanes and optionally hindered phenol) are typically used as activators in substantial molar excess compared to the total amount of metal in the catalysts (e.g. group 3 to 11, preferably 4 to 6 transition metal in the phenoxide catalyst and group 4 transition metal in the phosphinimine catalyst). Aluminum: total metal (in the catalyst) molar ratios may range from 10:1 to 10,000:1, preferably 10:1 to 500:1, most preferably from 50:1 to 150:1, especially from 90:1 to 120:1.

Typically the loading of the aluminoxane compound may range from 10 up to 60 weight % preferably from 15 to 50 weight %, most preferably from 20 to 40 weight % based on the weight of the calcined support impregnated with metal salt.

The aluminoxane is added to the support in the form of a hydrocarbyl solution, typically at a 5 to 30 weight % solution, preferably an 8 to 12 weight % solution, most preferably a 9 to 10 weight % solution. Suitable hydrocarbon solvents include $C_{5-12}$ hydrocarbons which may be unsubstituted or substituted by $C_{1-4}$ alkyl group such as pentane, hexane, heptane, octane, cyclohexane, methylcyclohexane, toluene, or hydrogenated naphtha. An additional solvent is Isopar™ E ($C_{8-12}$ aliphatic solvent, Exxon Chemical Co.).

The treated support may optionally be filtered and/or dried under an inert atmosphere (e.g. $N_2$) and optionally at reduced pressure, preferably at temperatures from room temperature up to about 80° C.

The optionally dried support with activator is then contacted with the catalysts again in a hydrocarbyl solution.

In an alternate embodiment the support could be treated with a combined solution of activator and catalyst(s). However care needs to be taken with this approach as prolonged contact (e.g. more than about 15 minutes) of the activator with the catalyst may result in degradation of one or both components.

The Catalysts
Phosphinimine Catalyst

The catalytic component the catalyst system is a phosphinimine catalyst of the formula:

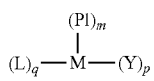

wherein M is a group 4 metal having an atomic weight less than 179; PI is a phosphinimine ligand; L is a monoanionic ligand selected from the group consisting of a cyclopentadienyl radical which is unsubstituted or substituted by a substituent selected from the group consisting of a $C_{1-6}$ alkyl radical which is substituted by 2n+1 fluorine atoms where n is the number of carbon atoms in the alkyl radical, and a $C_6F_5$ radical which cyclopentadienyl ligand is optionally further substituted with up to two $C_{3-6}$ alkyl radicals in the 2 or 3 position relative to the fluorine containing substituent; Y is an activatable ligand; m is 1 or 2; q is 1; and p is an integer and the sum of m+q+p equals the valence state of M.

The preferred metals (M) are from Group 4 (especially titanium, hafnium or zirconium) with titanium being most preferred (e.g. with an atomic weight less than 179).

The phosphinimine ligand is defined by the formula:

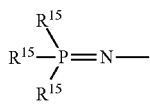

wherein each $R^{15}$ is independently selected from the group consisting of a $C_{1-8}$, preferably $C_{1-6}$ hydrocarbyl radicals which are unsubstituted or further substituted by a halogen atom. Most preferably the phosphinimine ligand is tris t-butyl phosphinimine.

In the phosphinimine catalyst preferably Y is selected from the group consisting of a hydrogen atom; a halogen atom, a $C_{1-10}$ hydrocarbyl radical. Most preferably Y is selected from the group consisting of a hydrogen atom, a chlorine atom and a $C_{1-4}$ alkyl radical.

The loading of the catalysts on the support should be such to provide from about 0.010 to 0.50, preferably from 0.015 to 0.40, most preferably from 0.015 to 0.036 mmol of metal M, preferably group 4 metal (e.g. Ti) from the catalysts per gram of support (support treated with $Zr(SO_4)_2 \cdot 4H_2O$ and calcined and treated with an activator).

The phosphinimine ligand containing catalyst may be added to the support in a hydrocarbyl solvent such as those noted above. The concentration of phosphinimine ligand containing catalyst in the solvent is not critical. Typically, it may be present in the solution in an amount from about 5 to 15 weight %.

The supported catalyst (e.g. support, $Zr(SO_4)_2$, activator and catalyst) typically has a reactivity in a dispersed phase reaction (e.g. gas or slurry phase) greater than 1,500 g of polymer per gram of support preferably greater than 2,000, most preferably greater than 2,200 g of polyethylene per gram of supported catalyst per hour normalized to an ethylene partial pressure of 200 psig (1379 kPa) and a temperature of 90° C. in the presence of 1-hexene comonomer.

The supported catalyst of the present invention may be used in dispersed phase polymerizations in conjunction with a scavenger such as an aluminum alkyl of the formula $Al(R^{30})_3$ wherein $R^{30}$ is selected from the group consisting of $C_{1-10}$ alkyl radicals, preferably $C_{2-4}$ alkyl radicals. The scavenger may be used in an amount to provide a molar ratio of Al:Ti from 20 to 2,000, preferably from 50 to 1,000, most preferably 100 to 500. Generally the scavenger is added to the reactor prior to the catalyst and in the absence of additional poisons, over time declines to 0.

The supported catalyst will have a kinetic profile for a plot of ethylene consumption in standard liters of ethylene per minute against time in minutes, corrected for the volume of ethylene in the reactor prior to the commencement of the reaction, in a 2 liter reactor over a period of time from 0 to 60 minutes is such that the ratio of the maximum peak height over the first 10 minutes to the average ethylene consumption from 10 to 60 minutes taken at not less than 40, preferably greater than 60, most preferably from 120 to 300 data points, is less than 2.50, preferably less than 2.25.

The supported catalyst may be used in conjunction with an antistatic agent. In one embodiment the antistatic is added directly to the supported catalyst. The antistatic may be added in an amount from 0 (e.g. optionally) up to 150,000 parts per million (ppm), preferably from 15,000 up to 120,000 ppm based on the weight of the supported catalyst.

In a further embodiment the antistatic may be added to the reactor in an amount from 0 to 100, preferably from 10 to 80 ppm based on the weight of the polymer produced (i.e. the weight of polymer in the fluidized bed or the weight of polymer dispersed in the slurry phase reactor). If present the antistatic agent may be present in an amount from about 0 to 100, preferably from about 10 to 80 most preferably from 20 to 50 ppm based in the weight of polymer. From the productivity of the catalyst it is fairly routine to determine the feed rate of the antistatic to the reactor based on the catalyst feed rate.

Antistatic "Polysulfone" Additive

The antistatic polysulfone additive comprises at least one of the components selected from:
(1) a polysulfone copolymer;
(2) a polymeric polyamine; and
(3) an oil-soluble sulfonic acid, and, in addition, a solvent for the polysulfone copolymer.

Preferably, the antistatic additive comprises at least two components selected from above components (1), (2) and (3). More preferably, the antistatic additive comprises a mixture of (1), (2) and (3).

According to the present invention, the polysulfone copolymer component of the antistatic additive (often designated as olefin-sulfur dioxide copolymer, olefin polysulfones, or poly(olefin sulfone)) is a polymer, preferably a linear polymer, wherein the structure is considered to be that of alternating copolymers of the olefins and sulfur dioxide, having a one-to-one molar ratio of the comonomers with the olefins in head to tail arrangement. Preferably, the polysulfone copolymer consists essentially of about 50 mole percent of units of sulfur dioxide, about 40 to 50 mole percent of units derived from one or more 1-alkenes each having from about 6 to 24 carbon atoms, and from about 0 to 10 mole percent of units derived from an olefinic compound having the formula ACH=CHB where A is a group having the formula—$(C_xH_{ex})$—COOH wherein x is from 0 to about 17, and B is hydrogen or carboxyl, with the provision that when B is carboxyl, x is 0, and wherein A and B together can be a dicarboxylic anhydride group.

Preferably, the polysulfone copolymer employed in the present invention has a weight average molecular weight in the range 10,000 to 1,500,000, preferably in the range 50,000 to 900,000. The units derived from the one or more 1-alkenes are preferably derived from straight chain alkenes having 6-18 carbon atoms, for example 1-hexene, 1-heptene, 1-octene, 1-decene, 1-dodecene, 1-hexadecene and 1-octadecene. Examples of units derived from the one or more compounds having the formula ACH=CHB are units derived from maleic acid, acrylic acid, 5-hexenoic acid.

A preferred polysulfone copolymer is 1-decene polysulfone having an inherent viscosity (measured as a 0.5 weight percent solution in toluene at 30° C.) ranging from about 0.04 dl/g to 1.6 dl/g.

The polymeric polyamines that can be suitably employed in the antistatic of the present invention are described in U.S. Pat. No. 3,917,466, in particular at column 6 line 42 to column 9 line 29.

The polyamine component in accordance with the present invention has the general formula:

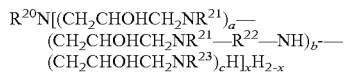

$$R^{20}N[(CH_2CHOHCH_2NR^{21})_a—(CH_2CHOHCH_2NR^{21}—R^{22}—NH)_b—(CH_2CHOHCH_2NR^{23})_cH]_xH_{2-x}$$

wherein $R^{21}$ is an aliphatic hydrocarbyl group of 8 to 24 carbon atoms; $R^{22}$ is an alkylene group of 2 to 6 carbon atoms; $R^{23}$ is the group $R^{22}$—$HNR^{21}$; $R^{20}$ is $R^{21}$ or an N-aliphatic hydrocarbyl alkylene group having the formula $R^{21}NHR^{22}$; a, b and c are integers from 0 to 20 and x is 1 or 2; with the proviso that when $R^{20}$ is $R^{21}$ then a is greater than 2 and b=c=0, and when $R^{20}$ is $R^{21}NHR^{22}$ then a is 0 and the sum of b+c is an integer from 2 to 20.

The polymeric polyamine may be prepared for example by heating an aliphatic primary monoamine or N-aliphatic hydrocarbyl alkylene diamine with epichlorohydrin in the molar proportion of from 1:1 to 1:1.5 at a temperature of 50° C. to 100° C. in the presence of a solvent, (e.g. a mixture of xylene and isopropanol) adding a strong base, (e.g. sodium hydroxide) and continuing the heating at 50 to 100° C. for about 2 hours. The product containing the polymeric polyamine may then be separated by decanting and then flashing off the solvent.

The polymeric polyamine is preferably the product of reacting an N-aliphatic hydrocarbyl alkylene diamine or an aliphatic primary amine containing at least 8 carbon atoms and preferably at least 12 carbon atoms with epichlorohydrin. Examples of such aliphatic primary amines are those derived from tall oil, tallow, soy bean oil, coconut oil and cotton seed oil. The polymeric polyamine derived from the reaction of tallowamine with epichlorohydrin is preferred. A method of preparing such a polyamine is disclosed in U.S. Pat. No. 3,917,466, column 12, preparation B.1.0

The above-described reactions of epichlorohydrin with amines to form polymeric products are well known and find extensive use in epoxide resin technology.

A preferred polymeric polyamine is a 1:1.5 mole ratio reaction product of N-tallow-1,3-diaminopropane with epichlorohydrin. One such reaction product is "Polyflo™130" sold by Universal Oil Company.

According to the present invention, the oil-soluble sulfonic acid component of the antistatic is preferably any oil-soluble sulfonic acid such as an alkanesulfonic acid or an alkylarylsulfonic acid. A useful sulfonic acid is petroleum sulfonic acid resulting from treating oils with sulfuric acid.

Preferred oil-soluble sulfonic acids are dodecylbenzenesulfonic acid and dinonylnaphthylsulfonic acid.

The antistatic additive preferably comprises 1 to 25 weight % of the polysulfone copolymer, 1 to 25 weight % of the polymeric polyamine, 1 to 25 weight % of the oil-soluble sulfonic acid and 25 to 95 weight % of a solvent. Neglecting the solvent, the antistatic additive preferably comprises about 5 to 70 weight % polysulfone copolymer, 5 to 70 weight % polymeric polyamine and 5 to 70 weight % oil-soluble sulfonic acid and the total of these three components is preferably 100%.

Suitable solvents include aromatic, paraffin and cycloparaffin compounds. The solvents are preferably selected from among benzene, toluene, xylene, cyclohexane, fuel oil, isobutane, kerosene and mixtures thereof.

According to a preferred embodiment of the present invention, the total weight of components (1), (2), (3) and the solvent represents essentially 100% of the weight of the antistatic additive.

One useful composition, for example, consists of 13.3 weight % 1:1 copolymer of 1-decene and sulfur dioxide having an inherent viscosity of 0.05 determined as above, 13.3 weight % of "Polyflo™ 130" (1:1.5 mole ratio reaction product of N-tallow-1,3-diaminopropane with epichlorohydrin), 7.4 weight % of either dodecylbenzylsulfonic acid or dinonylnaphthylsulfonic acid, and 66 weight % of an aromatic solvent which is preferably toluene or kerosene.

Another useful composition, for example, consists of 2 to 7 weight % 1:1 copolymer of 1-decene and sulfur dioxide having an inherent viscosity of 0.05 determined as above, 2 to 7 weight % of "Polyflo™ 130" (1:1.5 mole ratio reaction product of N-tallow-1,3-diaminopropane with epichlorohydrin), 2 to 8 weight % of either dodecylbenzylsulfonic acid or dinonylnaphthylsulfonic acid, and 78 to 94 weight % of an aromatic solvent which is preferably a mixture of 10 to 20 weight % toluene and 62 to 77 weight % kerosene.

According to a preferred embodiment of the present invention, the antistatic is a material sold by Octel under the trade name STADIS, preferably STADIS 450, more preferably STADIS 425.

Gas Phase Polymerization

Fluidized bed gas phase reactors to make polyethylene are generally operated at low temperatures from about 50° C. up to about 120° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi).

Gas phase polymerization of olefins is well known. Typically, in the gas phase polymerization of olefins (such as ethylene) a gaseous feed stream comprising of at least about 80 weight % ethylene and the balance one or more $C_{3-6}$ copolymerizable monomers typically, 1-butene, or 1-hexene or both, together with a ballast gas such as nitrogen, optionally a small amount of $C_{1-2}$ alkanes (i.e. methane and ethane) and further optionally a molecular weight control agent (typically hydrogen) is fed to a reactor and in some cases a condensable hydrocarbon (e.g. a $C_{4-6}$ alkane such as pentane). Typically, the feed stream passes through a distributor plate at the bottom of the reactor and vertically traverses a bed of polymer particles with active catalyst, typically a fluidized bed but the present invention also contemplates a stirred bed reactor. A small proportion of the olefin monomers in the feed stream react with the catalyst. The unreacted monomer and the other non-polymerizable components in the feed stream exit the bed and typically enter a disengagement zone where the velocity of the feed stream is reduced so that entrained polymer falls back into the fluidized bed. Typically the gaseous stream leaving the top of the reactor is then passed through a compressor. The compressed gas is then cooled by passage through a heat exchanger to remove the heat of reaction. The heat exchanger may be operated at temperatures below about 65° C., preferably at temperatures from 20° C. to 50° C. If there is a condensable gas it is usually condensed and entrained in the recycle stream to remove heat of reaction by vaporization as it recycles through the fluidized bed.

Polymer is removed from the reactor through a series of vessels in which monomer is separated from the off gases. The polymer is recovered and further processed. The off gases are fed to a monomer recovery unit. The monomer recovery unit may be selected from those known in the art including a distillation tower (i.e. a $C_2$ splitter), a pressure swing adsorption unit and a membrane separation device. Ethylene and hydrogen gas recovered from the monomer recovery unit are fed back to the reactor. Finally, make up feed stream is added to the reactor below the distributor plate.

Slurry Polymerization

Slurry processes are conducted in the presence of a hydrocarbon diluent such as an alkane (including isoalkanes), an aromatic or a cycloalkane. The diluent may also be the alpha olefin comonomer used in copolymerizations. Preferred alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5° C. to about 200° C., most preferably less than about 110° C. typically from about 10° C. to 80° C. The reaction temperature is selected so that the ethylene copolymer is produced in the form of solid particles. The reaction pressure is influenced by the choice of diluent and reaction temperature. For example, pressures may range from 15 to 45 atmospheres (about 220 to 660 psi or about 1,500 to about 4,600 kPa) when isobutane is used as diluent (see, for example, U.S. Pat. No. 4,325,849) to approximately twice that (i.e. from 30 to 90 atmospheres—about 440 to 1,300 psi or about 3,000-9,100 kPa) when propane is used (see U.S. Pat. No. 5,684, 097). The pressure in a slurry process must be kept sufficiently high to keep at least part of the ethylene monomer in the liquid phase.

The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

The slurry polymerization may also take place in a continuous stirred tank reactor.

The Polymer

The resulting polymer may have a density from about 0.910 g/cc to about 0.960 g/cc. The resulting polymers may be used in a number of applications such as blown and cast film, extrusion and both injection and rotomolding applications. Typically the polymer may be compounded with the usual additives including heat and light stabilizers such as hindered phenols; ultra violet light stabilizers such as hindered amine stabilizers (HALS); process aids such as fatty acids or their derivatives and fluoropolymers optionally in conjunction with low molecular weight esters of polyethylene glycol.

Phosphinimine Catalyst

Phosphinimine Ligand

To solid $tBu_3P$ (24.8 g, 123.0 mmol) at 25° C. was added trimethylsilylazide (2.0 mL, 15.0 mmol,). The reaction was warmed to 90° C. After 15 minutes further azide (3.0 mL) was added over the next 2 hours further azide (22.5 mL) was added in 3-9 mL aliquots (total azide added=27.5 mL, 208.0 mmol). The reaction was stirred at 95° C. for a further 4 hours then allowed to cool overnight before the excess azide was removed in vacuo. (34.4 g, 97%)

Metal Precursor.

A solution of hexafluorobenzene (59.5 g, 320.0 mmol) in 50 mL of THF was added dropwise over 10 to 15 minutes to two molar equivalents of sodium cyclopentadienide in THF (320.0 mL, 2.0 M, 640.0 mmol). The reaction was mildly exothermic and the reaction was maintained at about room temperature by cooling the reaction flask in an oil bath. On completing C6F6 addition, the purple reaction mixture was heated and kept at 60° C. for 3 hours. The reaction was allowed to cool slightly and was then added to neat chlorotrimethylsilane (60.0 mL, 450.0 mmol) at 0° C. over 15-30 minutes. After an additional 30 minutes, the reaction was warmed to 30° C. and the THF, excess chlorotrimethylsilane and other volatiles were removed in vacuo. The resulting wet solid was washed with heptane and filtered to remove inorganic solids. Concentration of the heptane filtrate in vacuo yielded an oily product, (76.6 g, 79%). Butyllithium (1.6 M in hexane, 157.0 mL, 252.0 mmol) was added to this oil in THF (50 mL) at 0° C. and the mixture allowed to warm to room temperature and stirred for an additional 45 minutes. The reaction mixture was added to TiCl4 (47.8 g, 252.0 mmol) and the reaction mixture heated to 60° C. for 3 hours. Volatiles were removed in vacuo to yielding the metal precursor (74.8 g, 77%).

Final Complex.

The metal precursor (9.6 g, 25.0 mmol) and the phosphinimine ligand (7.2 g, 25.0 mmol) were weighed together into a Schlenk flask and toluene (150 mL) added. The reaction was heated at 90° C. for 5 hours. The volume of the reaction mixture was reduced to 15 mL and heptane (100 mL) added. The mixture was stirred overnight and then filtered and washed with heptane. The solids collected were dried in vacuo (12.6 g, 86%).

The aluminoxane was a 10% MAO solution in toluene supplied by Albemarle.

The support was HIQ-20 alumina obtained from Alcoa Industrial Chemicals. The support had a particle size of 50 μm, a surface area of 280 $m^2$/g and a pore volume of 0.48 cc/g.

Preparation of the Support (Apart from the Control)

A 10% aqueous solution of the $Zr(SO_4).4H_2O$ was prepared and impregnated into the support by incipient wetness impregnation procedure. The solid support was dried in air at about 135° C. to produce a free flowing powder. The resulting powder was subsequently dried in air at 200° C. for about 2 hours under air and then under nitrogen at 600° C. for 6 hours.

To a slurry of calcined support in toluene was added a toluene solution of 10 weight % MAO (4.5 weight % Al, purchased from Albemarle) plus rinsings (3×5 mL). The resultant slurry was mixed using a shaker for 1 hour at ambient temperature. To this slurry of MAO-on-support was added a toluene solution of catalyst to give a molar ratio of Al:Ti of 120:1. After two hours of mixing at room temperature using a shaker, the slurry was filtered, yielding a colorless filtrate. The solid component was washed with toluene and pentane (2×), then ~400 mTorr and sealed under nitrogen until use.

For the comparative example the same procedure was used except that the support was not treated with $Zr(SO_4) \cdot 4H_2O$.

Polymerization

A 2 L reactor fitted with a stirrer (~675 rpm) containing a NaCl seed bed (160 g) (stored for at least 3 days at 130° C.) was conditioned for 30 minutes at 105° C. An injection tube loaded in the glovebox containing the catalyst formulation was inserted into the reactor system, which was then purged 3 times with nitrogen and once with ethylene at 200 psi. Pressure and temperature were reduced in the reactor (below 2 psi and between 60 and 85° C.) and TIBAL (500:1 Al:Ti) was injected via gastight syringe followed by a 2 mL pre-charge of 1-hexene. After the reactor reached 85° C. the catalyst was injected via ethylene pressure and the reactor was pressurized to 200 psi total pressure with 1-hexene fed with a syringe pump at a mole ratio of 6.5% $C_6/C_2$ started 1 minute after catalyst injection. The temperature of reaction was controlled at 90° C. for a total runtime of 60 minutes. Reaction was halted by stopping the ethylene flow and turning on reactor cooling water. The reactor was vented slowly to minimize loss of contents and the polymer/salt mixture was removed and allowed to air dry before being weighed.

Fouling was measured by collecting the polymer from the reactor (including lumps and sheeted material) and sieving through a number 14 sieve (1.4 mm openings) the product (lightly brushing but not "pushing" product through) to determine what percent of the polymer did not pass through the sieve as a percentage of the total polymer produced. The results of the experiments are set forth in Table 1 below. Unfortunately the catalyst and modified catalyst are both extremely reactive resulting in fouling behavior which was poor.

TABLE 1

| Support | AL:Ti Molar ratio | Productivity gPE/g catalyst | Max $C_2$ Flow | Time to Max Flow | Rate of Rise scLM/min | Max height 1-10/ Average $C_2$ concentration | Fouling % |
|---|---|---|---|---|---|---|---|
| Phosphin-imine:$Zr(SO_4)_2$/ HiQ alumina | 120:1 | 2399 | 1.33 | 2.60 | 0.51 | 2.01 | 100 |
| Phosphinimine HiQ alumina | 120:1 | 2743 | 1.92 | 2.83 | 0.86 | 2.68 | 100 |

FIG. 1 is a kinetic profile of the catalyst on alumina and modified alumina. As noted above the catalyst is extremely "hot" and both catalysts have a very significant initial rate of reaction. However, after about a minute it is clear the modified catalyst has a lower and more consistent rate of reaction.

What is claimed is:

1. A catalyst system having an activity greater than 1,500 g of polymer per gram of supported catalyst per hour normalized to 1,379 kPag (200 psig) of ethylene partial pressure and a temperature of 90° C. in the presence of 1-hexene comonomer and having a kinetic profile for a plot of ethylene consumption in standard liters of ethylene per minute against time in minutes, at a reaction pressure of 1,379 kPag (200 psig) and 90° C., corrected for the volume of ethylene in the reactor prior to the commencement of the reaction, in a 2 liter reactor over a period of time from 0 to 60 minutes such that the ratio of the maximum peak height over the first 10 minutes to the average ethylene consumption from 10 to 60 minutes taken at not less than 40 data points, of less than 2.5, comprising:

(i) an alumina support having an average particle size from 10 to 150 microns, a surface area greater than 100 m²/g, and a pore volume greater than 0.3 ml/g impregnated with (ii) at least a 1 weight % of $Zr(SO_4)_2 \cdot 4H_2O$, based on the weight of the alumina support;

(iii) from 10 to 60 weight % of an aluminum activator based on the weight of said alumina support, said activator having the formula:

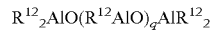

wherein each $R^{12}$ is independently selected from the group consisting of $C_{1-20}$ hydrocarbyl radicals and q is from 3 to 50; and (iv) from 0.1 to 30 weight % of a phosphinimine catalyst of the formula:

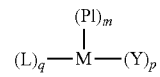

wherein M is a group 4 metal having an atomic weight less than 179; PI is a phosphinimine ligand of the formula

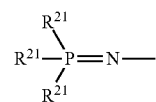

wherein each $R^{21}$ is independently selected from the group consisting of a hydrogen atom; a halogen atom; and $C_{1-10}$ hydrocarbyl radicals which are unsubstituted by or further substituted by a halogen atom; L is a monoanionic ligand selected from the group consisting of a cyclopentadienyl radical which is unsubstituted or substituted by a substituent selected from the group consisting of a $C_{1-6}$ alkyl radical which is substituted by 2n+1 fluorine atoms where n is the number of carbon atoms in the alkyl radical, and a $C_6F_5$ radical which cyclopentadienyl ligand is optionally further substituted with up to two $C_{3-6}$ alkyl radicals in the 2 or 3 position relative to the fluorine containing substituent; Y is an activatable ligand; m is 1 or 2; q is 1; and p is an integer and the sum of m+q+p equals the valence state of M.

2. The catalyst according to claim 1, further comprising from 50 to 250 ppm based on the weight of the supported catalyst of an antistatic comprising:

(i) from 3 to 48 parts by weight of one or more polysulfones comprising:
(a) 50 mole % of sulphur dioxide;
(b) 40 to 50 mole % of a $C_{6-20}$ an alpha olefin; and
(c) from 0 to 10 mole % of a compound of the formula ACH=CHB where A is selected from the group consisting of a carboxyl radical and a $C_{1-15}$ carboxy alkyl radical and B is a hydrogen atom or a carboxyl radical provided if A and B are carboxyl radicals A and B may form an anhydride;
   (ii) from 3 to 48 parts by weight of one or more polymeric polyamides of the formula:

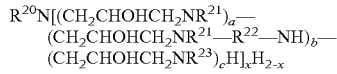

wherein $R^{21}$ is an aliphatic hydrocarbyl group of 8 to 24 carbon atoms; $R^{22}$ is an alkylene group of 2 to 6 carbon atoms; $R^{23}$ is the group $R^{22}$—$NR^{21}$; $R^{20}$ is $R^{21}$ or an N-aliphatic hydrocarbyl alkylene group having the formula $R^{21}NHR^{22}$; a, b and c are integers from 0 to 20 and x is 1 or 2; with the proviso that when $R^{20}$ is $R^{21}$ then a is greater than 2 and b=c=0, and when $R^{20}$ is $R^{21}NHR^{22}$ then a is 0 and the sum of b+c is an integer from 2 to 20; and
   (iii) from 3 to 48 parts by weight of $C_{10-20}$ alkyl or arylalkyl sulphonic acid.

3. A disperse phase polymerization process comprising contacting one or more $C_{2-8}$ alpha olefins with a catalyst system according to claim 1, and feeding to a reactor from 10 to 80 ppm based on the weight of polymer produced of an antistatic comprising:
   (i) from 3 to 48 parts by weight of one or more polysulfones comprising:
      (a) 50 mole % of sulphur dioxide;
      (b) 40 to 50 mole % of a $C_{6-20}$ an alpha olefin; and
      (c) from 0 to 10 mole % of a compound of the formula ACH=CHB where A is selected from the group consisting of a carboxyl radical and a $C_{1-15}$ carboxy alkyl radical and B is a hydrogen atom or a carboxyl radical provided if A and B are carboxyl radicals A and B may form an anhydride;
   (ii) from 3 to 48 parts by weight of one or more polymeric polyamides of the formula:

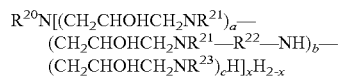

wherein $R^{21}$ is an aliphatic hydrocarbyl group of 8 to 24 carbon atoms; $R^{22}$ is an alkylene group of 2 to 6 carbon atoms; $R^{23}$ is the grup $R^{22}$—$NR^{21}$; $R^{20}$ is $R^{21}$ or an N-aliphatic hydrocarbyl alkylene group having the formula $R^{21}NHR^{22}$; a, b and c are integers from 0 to 20 and x is 1 or 2; with the proviso that when $R^{20}$ is $R^{21}$ then a is greater than 2 and b=c=0, and when $R^{20}$ is $R^{21}NHR^{22}$ then a is 0 and the sum of b+c is an integer from 2 to 20; and
   (iii) from 3 to 48 parts by weight of $C_{10-20}$ alkyl or arylalkyl sulphonic acid.

\* \* \* \* \*